(12) United States Patent
Porter et al.

(10) Patent No.: US 9,716,711 B2
(45) Date of Patent: Jul. 25, 2017

(54) HIGH-VALUE DOCUMENT AUTHENTICATION SYSTEM AND METHOD

(75) Inventors: RanDair Porter, Redmond, WA (US); Takahiro Gotanda, Kawaguchi (JP)

(73) Assignee: PAGEMARK TECHNOLOGY, INC., Redmond, WA (US)

(*) Notice: Subject to any disclaimer, the term of this patent is extended or adjusted under 35 U.S.C. 154(b) by 0 days.

(21) Appl. No.: 13/184,284

(22) Filed: Jul. 15, 2011

(65) Prior Publication Data
US 2013/0015236 A1  Jan. 17, 2013

(51) Int. Cl.
| G06K 7/10 | (2006.01) |
| G06K 19/00 | (2006.01) |
| G06K 19/06 | (2006.01) |
| G06K 5/00 | (2006.01) |
| G06K 7/01 | (2006.01) |
| G06F 17/00 | (2006.01) |
| H04L 29/06 | (2006.01) |
| G06Q 10/08 | (2012.01) |
| G06F 21/64 | (2013.01) |

(52) U.S. Cl.
CPC .......... *H04L 63/083* (2013.01); *G06F 21/645* (2013.01); *G06Q 10/08* (2013.01)

(58) Field of Classification Search
CPC ...... H04L 63/083; G06Q 10/08; G06F 21/645
USPC ....... 235/375, 494, 487, 462.01, 382, 382.5, 235/454; 713/176; 283/113; 358/3.28
See application file for complete search history.

(56) References Cited

U.S. PATENT DOCUMENTS

| 4,813,912 | A | * | 3/1989 | Chickneas | G07B 17/00193 235/375 |
| 5,483,363 | A | * | 1/1996 | Holmes et al. | 359/2 |
| 5,490,217 | A | * | 2/1996 | Wang | G07F 7/08 235/462.09 |
| 5,502,304 | A | * | 3/1996 | Berson et al. | 250/271 |
| 5,548,110 | A | * | 8/1996 | Storch et al. | 235/462.07 |
| 5,602,382 | A | * | 2/1997 | Ulvr | B07C 3/18 235/375 |
| 5,710,417 | A | * | 1/1998 | Joseph | G06K 7/10584 235/462.11 |
| 5,768,384 | A | * | 6/1998 | Berson | 705/50 |
| 5,773,806 | A | * | 6/1998 | Longacre, Jr. | G06K 7/10851 235/462.1 |
| 5,920,062 | A | * | 7/1999 | Williams | G06K 7/1434 235/462.08 |
| 5,970,140 | A | * | 10/1999 | Sandford, II | G06T 1/0028 380/205 |
| 6,032,861 | A | * | 3/2000 | Lemelson | G06K 7/14 235/456 |
| 6,102,289 | A | * | 8/2000 | Gabrielson | G06K 19/06028 235/462.01 |
| 6,177,683 | B1 | * | 1/2001 | Kolesar et al. | 250/566 |
| 6,308,991 | B1 | * | 10/2001 | Royer | 283/102 |
| 6,354,501 | B1 | * | 3/2002 | Outwater et al. | 235/462.01 |
| 6,398,117 | B1 | * | 6/2002 | Oakeson | G06K 1/121 235/456 |
| 6,457,651 | B2 | * | 10/2002 | Paul | G06K 19/06028 235/375 |
| 6,523,741 | B1 | * | 2/2003 | DiMaria et al. | 235/375 |
| 6,540,143 | B1 | * | 4/2003 | Matsumori | G06K 7/14 235/382 |

(Continued)

*Primary Examiner* — Daniel Walsh
(74) *Attorney, Agent, or Firm* — Stoel Rives LLP

(57) ABSTRACT

Provided herein are systems and methods for providing document certification and authentication using 2D barcodes.

21 Claims, 16 Drawing Sheets

(56) References Cited

U.S. PATENT DOCUMENTS

| | | | |
|---|---|---|---|
| 6,567,530 B1* | 5/2003 | Keronen et al. | 382/100 |
| 6,572,025 B1* | 6/2003 | Nishikado et al. | 235/494 |
| 6,735,575 B1* | 5/2004 | Kara | G07B 17/00508 283/57 |
| 6,886,863 B1* | 5/2005 | Mowry, Jr. | B42D 25/29 235/494 |
| 6,902,265 B2 | 6/2005 | Critelli et al. | 347/101 |
| 6,907,528 B1* | 6/2005 | Bunn | 713/179 |
| 6,948,068 B2* | 9/2005 | Lawandy et al. | 713/176 |
| 7,552,863 B2* | 6/2009 | Koziol | G06F 8/60 235/375 |
| 7,783,885 B2* | 8/2010 | Dietl | G06Q 10/10 283/113 |
| 7,973,944 B2* | 7/2011 | Hasuike | 358/1.1 |
| 8,059,858 B2* | 11/2011 | Brundage et al. | 382/100 |
| 8,294,923 B2* | 10/2012 | Gonzalez Marti | G06F 17/243 235/462.01 |
| 8,500,023 B2* | 8/2013 | Zolotov | G06K 7/10722 235/462.04 |
| 9,064,138 B2* | 6/2015 | Pawlik | G06K 5/00 |
| 9,111,186 B2* | 8/2015 | Blasinski | G06K 19/0614 |
| 9,213,931 B1* | 12/2015 | Annan | G06K 19/06 |
| 2001/0045461 A1* | 11/2001 | Schuessler | G06K 7/14 235/462.07 |
| 2001/0050308 A1* | 12/2001 | Paul et al. | 235/375 |
| 2002/0023955 A1* | 2/2002 | Frank et al. | 235/382 |
| 2002/0065853 A1* | 5/2002 | Takahashi et al. | 707/527 |
| 2002/0067827 A1* | 6/2002 | Kargman | 380/54 |
| 2003/0004792 A1* | 1/2003 | Townzen et al. | 705/1 |
| 2003/0035539 A1* | 2/2003 | Thaxton | 380/51 |
| 2003/0099204 A1* | 5/2003 | Subrahmanyan | H04J 3/076 370/252 |
| 2004/0001133 A1* | 1/2004 | Critelli et al. | 347/101 |
| 2004/0117627 A1* | 6/2004 | Brewington | H04N 1/32133 713/176 |
| 2004/0211844 A1* | 10/2004 | Marshall | 235/494 |
| 2005/0052519 A1* | 3/2005 | Mayer et al. | 347/105 |
| 2005/0077346 A1* | 4/2005 | Dutta et al. | 235/375 |
| 2005/0097335 A1* | 5/2005 | Shenoy et al. | 713/182 |
| 2005/0097408 A1* | 5/2005 | Palin | H04B 1/7183 714/700 |
| 2005/0199724 A1* | 9/2005 | Lubow | 235/462.01 |
| 2005/0258250 A1* | 11/2005 | Melick et al. | 235/462.46 |
| 2005/0269416 A1* | 12/2005 | Sussmeier | G06K 7/12 235/494 |
| 2005/0276520 A1* | 12/2005 | Leslie et al. | 382/306 |
| 2005/0279235 A1* | 12/2005 | Barthram et al. | 101/483 |
| 2006/0022059 A1* | 2/2006 | Juds | 235/494 |
| 2006/0117182 A1* | 6/2006 | Wolff | G06F 21/64 713/176 |
| 2006/0118631 A1* | 6/2006 | Lubow | G06K 1/121 235/462.01 |
| 2006/0119876 A1* | 6/2006 | Kenner | 358/1.14 |
| 2006/0124726 A1* | 6/2006 | Kotovich | G06Q 20/04 235/379 |
| 2006/0157559 A1* | 7/2006 | Levy et al. | 235/380 |
| 2006/0161977 A1* | 7/2006 | Jung et al. | 726/21 |
| 2006/0225595 A1* | 10/2006 | Gilfix | 101/489 |
| 2006/0231635 A1* | 10/2006 | Kim et al. | 235/494 |
| 2006/0259773 A1* | 11/2006 | Jung et al. | 713/176 |
| 2006/0273156 A1* | 12/2006 | Berm et al. | 235/380 |
| 2008/0000991 A1* | 1/2008 | Yin | G06K 1/123 235/494 |
| 2008/0002882 A1 | 1/2008 | Voloshynovskyy | |
| 2008/0149713 A1* | 6/2008 | Brundage | 235/435 |
| 2009/0067905 A1* | 3/2009 | Fisher et al. | 399/361 |
| 2009/0073503 A1* | 3/2009 | Lebaschi et al. | 358/450 |
| 2009/0108081 A1 | 4/2009 | Zwirner | |
| 2009/0134227 A1 | 5/2009 | Roth | |
| 2009/0302123 A1* | 12/2009 | Lugt et al. | 235/494 |
| 2009/0310824 A1* | 12/2009 | Kenner | 382/106 |
| 2010/0012728 A1* | 1/2010 | Rosset et al. | 235/462.05 |
| 2010/0020970 A1* | 1/2010 | Liu | G06K 7/1093 380/255 |
| 2010/0301111 A1* | 12/2010 | Nakata | H04N 1/00867 235/375 |
| 2011/0010757 A1* | 1/2011 | Tharakan | G06F 17/30011 726/3 |
| 2011/0019220 A1* | 1/2011 | Kikuchi | G03G 21/046 358/1.14 |
| 2011/0121066 A1* | 5/2011 | Tian et al. | 235/375 |
| 2011/0122452 A1* | 5/2011 | Zhao et al. | 358/3.28 |
| 2011/0127331 A1* | 6/2011 | Zhao et al. | 235/462.01 |
| 2011/0192906 A1* | 8/2011 | Wilds et al. | 235/468 |
| 2011/0298204 A1* | 12/2011 | Eschbach | 283/67 |
| 2012/0023335 A1* | 1/2012 | Bals | H04N 1/32133 713/176 |
| 2012/0104105 A1* | 5/2012 | Nemet et al. | 235/494 |
| 2012/0197805 A1* | 8/2012 | Chung | 705/64 |
| 2012/0206773 A1* | 8/2012 | Gilfix | 358/3.28 |
| 2012/0251715 A1* | 10/2012 | Dalal et al. | 427/157 |
| 2014/0084061 A1* | 3/2014 | Kimura | G06K 7/1413 235/437 |
| 2014/0254796 A1* | 9/2014 | Li | H04L 9/3247 380/246 |
| 2014/0355069 A1* | 12/2014 | Caton | H04N 1/0087 358/3.28 |
| 2015/0102964 A1* | 4/2015 | Itoh | H01Q 1/38 343/700 MS |

* cited by examiner

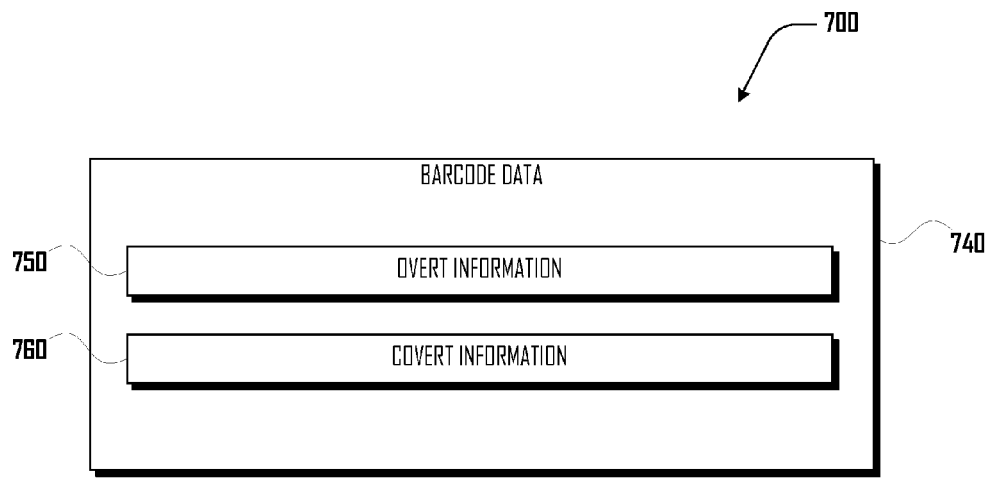
Fig. 7A
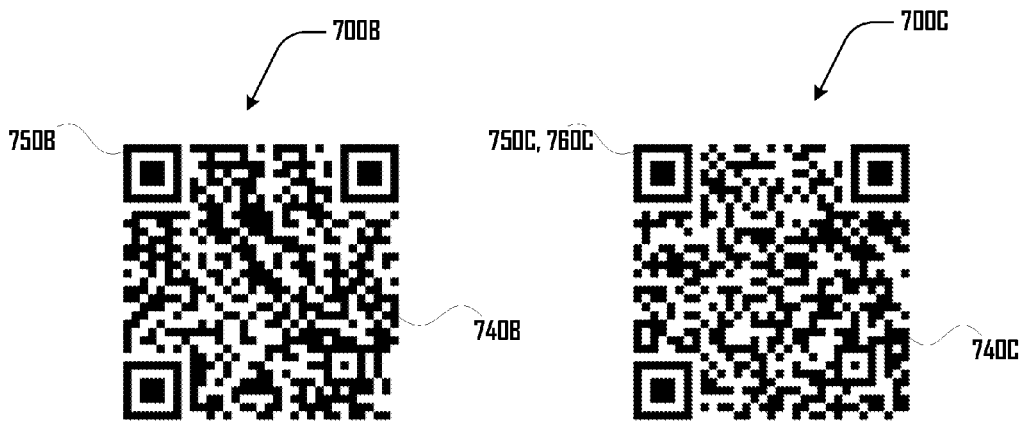
Fig. 7B
Fig. 7C

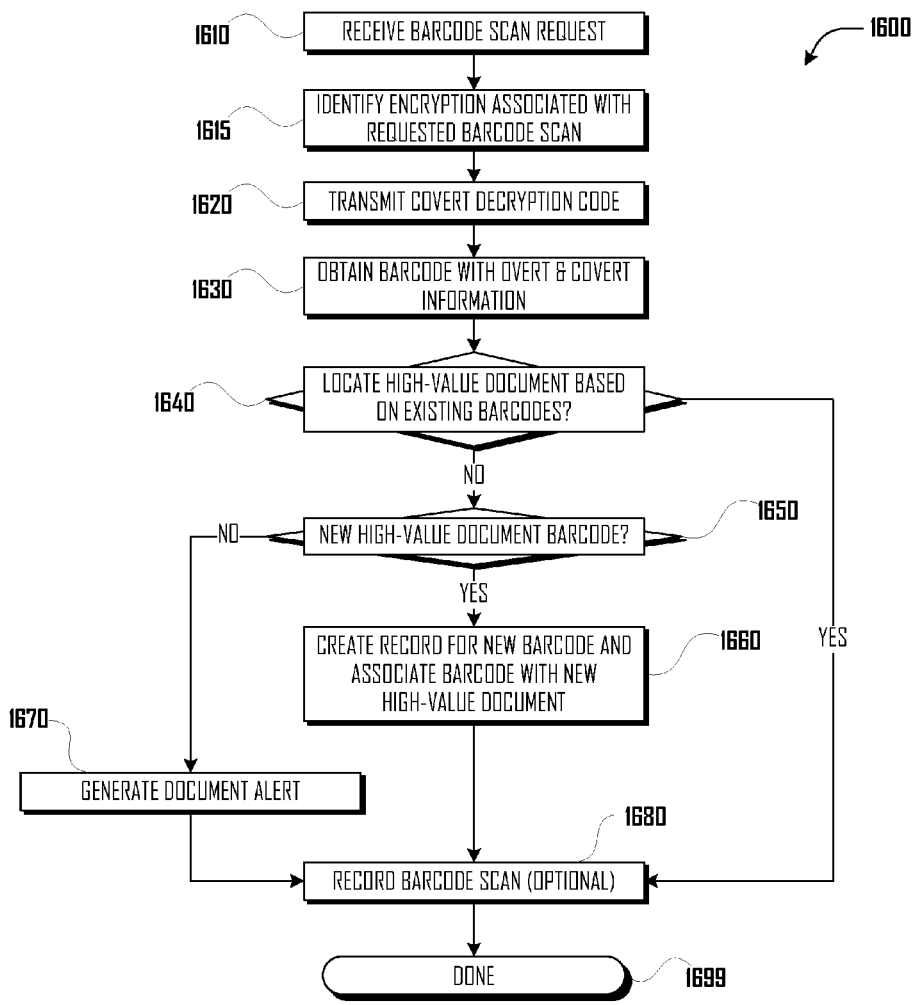

HIGH-VALUE DOCUMENT AUTHENTICATION SYSTEM AND METHOD

FIELD

The present disclosure relates to secure document publication, and more particularly, to systems and methods for providing document certification and authentication.

BACKGROUND

As publishing tools and technology available to a potential counterfeiter improve, the problems associated with forgery become an ever increasing challenge for government, consumer, and commercial organizations. Almost half of all identity theft is directly related to the replication of information obtained from stolen wallets and physical paperwork. Modern publication tools make the process of creating or adapting fake high-value documents using stolen information easier for the skilled identity thief and consequently make detection of the forgery difficult. However, creating a forged document is often only the first step. Typically, the false, forged, altered or counterfeit record, deed, instrument or other writing must then be successfully uttered and published (passed) before significant damage can be done. Unfortunately, the individual receiving the forged document is rarely a trained expert and is likely unable to do an exhaustive investigation into document authenticity before completing the transaction.

BRIEF DESCRIPTION OF THE DRAWINGS

FIGS. 7A-7C illustrate barcode data in accordance with various embodiments.

FIG. 16 illustrates a flow diagram of a document tracking routine for a high-value document server shown in FIG. 5 in accordance with one embodiment.

DESCRIPTION

Figure 1:
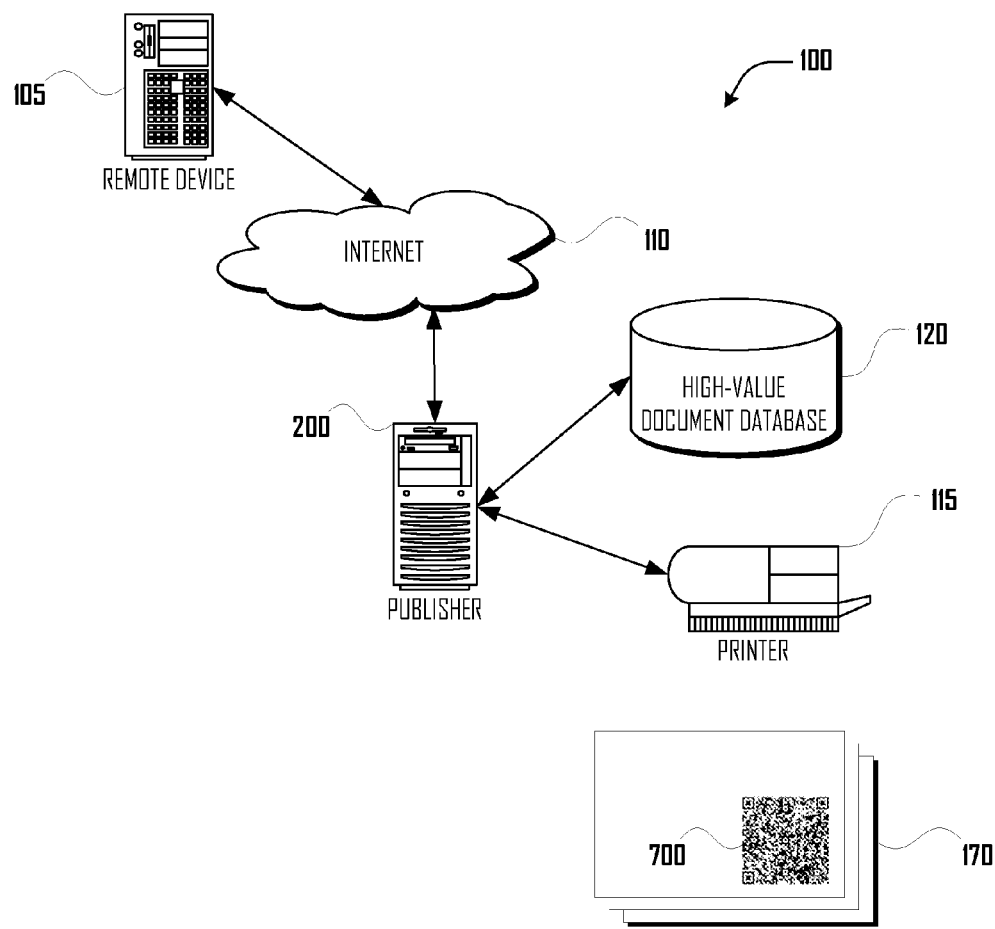
FIG. 1 illustrates a suitable operating environment for high-value document certification and publishing systems in accordance with at least one embodiment.

In accordance with various embodiments, a document authentication service may provide consumers with authentication of certified high-value documents. A high-value document may be certified after a document authentication code is encoded into a two dimensional (2D) barcode and embedded in the document. Subsequently, the certified high-value document may be authenticated by reading the document authentication code contained within the 2D barcode and comparing it with the document. If there is a match, the certified high-value document may be authenticated. Pagemark Technology, Inc. (http://www.pagemarktechnology.com) provides commercial services based on Pelta™ Barcodes that include one embodiment of such a document certification and authentication service.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment; including remote file servers, computer servers, publishing resources, and/or memory storage devices. Each of these conventional distributed computing components is accessible by the processor via a communication network. In a heterogeneous distributed computing environment, clients, servers, and client/servers may be, for example, mainframes, minicomputers, workstations, or personal computers. Most services in a heterogeneous distributed computing environment can be grouped into one of these major categories: distributed file system, distributed computing resources, and messaging. A distributed file system provides a client with transparent access to part of the mass storage of a remote network device, such as a server. Distributed computing resources provide a client with access to computational or processing power of remote network devices, such as a cloud server. In one embodiment, distributed computing resources also provide a client with access to remote resources, such as printing/publication assets associated with remote network devices.

The phrases "in one embodiment," "in various embodiments," "in some embodiments," and the like are used repeatedly. Such phrases do not necessarily refer to the same embodiment, but they may unless the context dictates otherwise. The terms "comprising," "having," and "including" are synonymous, unless the context dictates otherwise. The terms "2-D barcode", "2D barcode", and "matrix barcode" are synonymous and generally refer to a two dimensional barcode with encoded information that a scanner may read both horizontally and vertically. There are a variety of different 2D barcodes including, but not limited to Quick Response Codes (hereinafter "QR code"), Data Matrix codes, Aztec codes, MaxiCode, Semacode tags, Cauzin Softstrip codes, EZcode, High Capacity Color Barcode (HCCB), CyberCode, Mobile Multi-Coloured Composite (MMCC), Dot codes, PDF417 symbols, ShotCode, SPAR-QCode, WaterCode. Trusted Paper Key (TPK), and the like. Clearly, some 2D barcodes may contain information in an encrypted form. Moreover, many 2D barcodes have been optimized for use with smartphones and other mobile phones such that they may be read quickly and accurately with or without an auto-focus camera.

Reference is now made in detail to the description of the embodiments as illustrated in the drawings. Particular embodiments described in this application provide specific case implementations of document certification by affixing a 2D barcode in the document and of document authentication by scanning 2D barcode labels affixed to a particular document. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Various aspects of the illustrative embodiments will be described using terms commonly employed by those skilled in the art to convey the substance of their work to others skilled in the art. However, the embodiments described herein may be practiced with only some of the described aspects. For purposes of explanation, specific numbers, materials, and configurations may be set forth to provide a thorough understanding of the illustrative embodiments. However, the embodiments described herein may be practiced without the specific details. In other instances, well-known features are omitted or simplified in order not to obscure the illustrative embodiments.

Further, various operations and/or communications may be described as multiple discrete operations and/or communications, in turn, in a manner that may be helpful in understanding the embodiments described herein; however, the order of description should not be construed as to imply that these operations and/or communications are necessarily order dependent. In particular, these operations and/or communications need not be performed in the order of presentation.

Referring now to FIG. 1, a suitable operating environment 100 for high-value document certification and publishing systems is shown in accordance with at least one embodiment. The environment 100 may include a remote device 105 coupled via communications network 110 to a publisher 200. In one embodiment, the remote device 105 may send a document certification request having document data. The document data may include overt data and covert data. Alternatively, the publisher 200 may receive a document to be certified from the remote device 105 and automatically assign overt data and covert data based on the received document.

The publisher 200 uses the overt data and covert data to generate a barcode 700 having an overtly readable barcode portion based on the overt data and a covertly readable barcode portion based on the covert data. The covertly readable barcode portion of barcode 700 is unreadable to a conventional barcode reader suitable to read the overtly readable barcode portion. In many embodiments, the publisher 200 may be operated by a person or entity that actually developed and/or publishes the certified high-value document. In other embodiments, a third party may be able to certify a document with a barcode for later authentication, with or without the knowledge of the actual document author, developer, or publisher, by performing operations similar to those attributed herein to publisher 200.

As illustrated, the publisher 200 may also include a printer 115 and a high-value document database 120. The publisher 200 may incorporate the barcode 700 into the document to form a certified high-value document 170. Placing a barcode 700 on the high-value document 170 provides a machine readable way to uniquely identify, certify, and authenticate the high-value document 170. High-value documents 170 may include any material bearing marks, signs or symbols intended to convey a message or meaning to someone whose authenticity may need to be verified. For example, an official record, deed, certificate, prescriptions and other medical forms, patient records, travel documents, tax stamp/tag, contract, instrument, coupons, food stamps, identification card, voter ballets, invoices, event tickets, or other writing.

In one alternative embodiment, the barcode 700 need not be directly incorporated into the document, but may instead be printed onto a seal, label, or tag to then be placed on the document or item to be authenticated. For example, barcode 700 may be printed onto a holographic vehicle registration tag which may then be affixed to the license plate of a registered vehicle. The holographic tag may later be scanned to confirm make, model, and/or Vehicle Identification Number (VIN) of the registered vehicle.

Alternatively, a barcode seal might be placed on a will or deed to provide additional authentication. The overt information might include information about the author or signatory of the document, while the covert information might include a hash or message digest of something representing a larger collection of information on the page. In one embodiment, a certification barcode seal might be added to a product to enable the consumer to verify product authenticity. In one embodiment, the barcode might even be used to track a particular high-value asset or product both to verify product authenticity and to help avoid counterfeiting.

In one embodiment, the barcode 700 is a 2D barcode that uses a public domain barcode standard, such as ISO/IEC 18004. 2D barcodes provide a simple, inexpensive, yet powerful way to ensure important documents such as vital records, certificates of origin, identification badges, travel document, registration documents, and packaging material are authentic.

In one embodiment, the barcode 700 includes a unique hidden layer that is secretly encoded on top of a standard barcode. The hidden layer includes encrypted covert information. Despite this hidden layer, the barcode 700 generated by the publisher 200 appears in every way like a standard machine readable barcode. In one embodiment, the barcode 700 includes an overtly readable barcode portion based on encoded overt data and a covertly readable barcode portion based on encoded covert data. While the overtly readable barcode portion is readable by a conventional barcode reader configured to read a designated 2D barcode, the covertly readable barcode portion is unreadable. In one embodiment, the encrypted covert message can be tied to other visible information on the document 170 providing another method to validate authenticity of the document 170. Accordingly, creation of the hidden information within the barcode 700 is extremely difficult for a counterfeiter to replicate. To this end, the barcode 700 also contains standard messages that would be readable by any standardized barcode reader. This information is contained in a message payload of overt data, which may be read by most smartphones, web cameras or desktop cameras. In contrast, one embodiment provides that the covert information may only be read by a scanner using a covert scan key, which may be obtained from an authentication server. In one embodiment, supplemental software applications configured to read the covert data may also be deployed for use with smartphones, web cameras, or desktop cameras.

Figure 2:
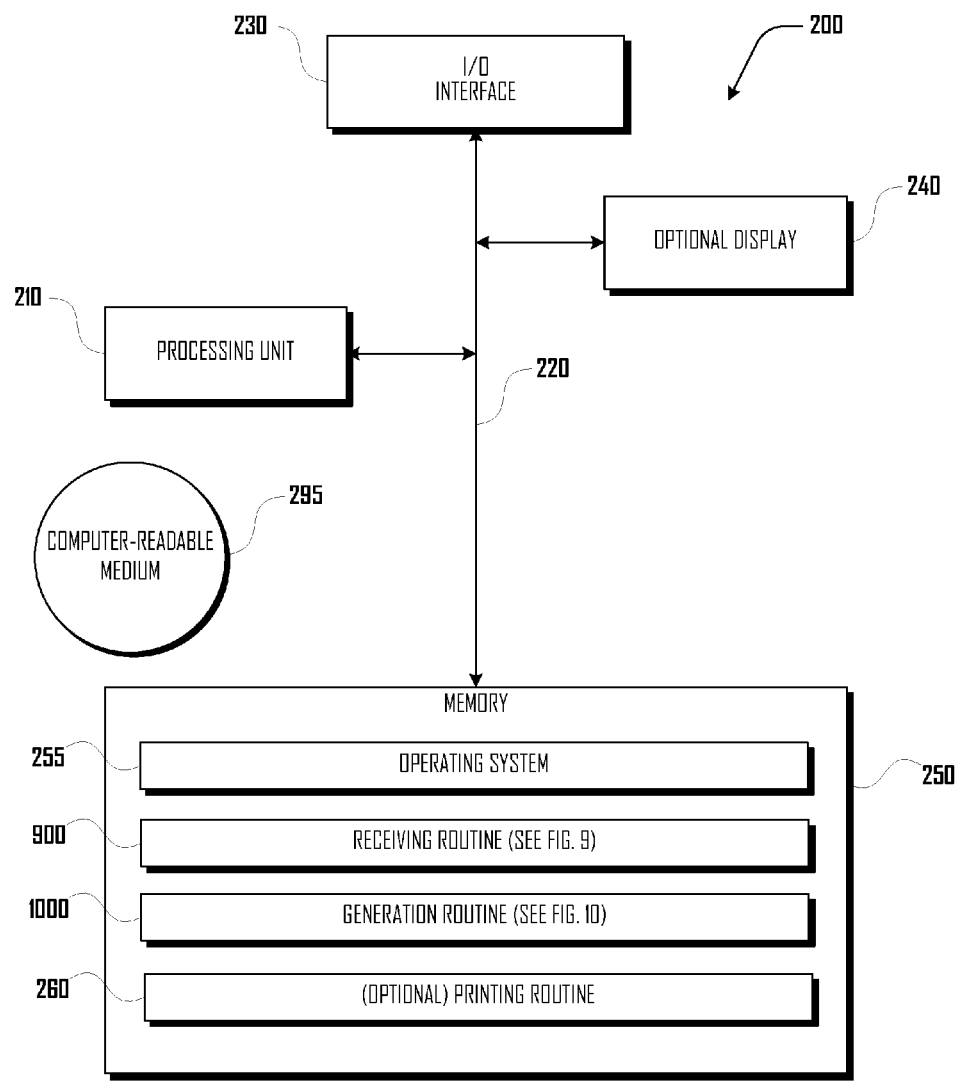
FIG. 2 illustrates several components of a high-value document publisher in accordance with one embodiment.

Referring now to FIG. 2, several components of a high-value document publisher 200 are shown in accordance with one embodiment. In some embodiments, publisher 200 may include many more components than those shown in FIG. 2. However, it is not necessary that all of these generally conventional components be shown in order to disclose an illustrative embodiment.

As shown in FIG. 2, the publisher 200 includes an Input/Output (I/O) communication interface 230 for connecting to a communications network 110, e.g., the Internet. The I/O communication interface 230 may also include a variety of Input/Output ports that each serve as a potential interface between the publisher 200 and other computers or peripheral devices and may include Ethernet, FireWire, Serial, Parallel, coaxial cable, and Universal Serial Bus (USB) ports.

The publisher 200 also includes a processing unit 210, a memory 250, and an optional display 240, all interconnected, along with the I/O communication interface 230, via a bus 220. The memory 250 generally comprises a random access memory ("RAM"), a read only memory ("ROM"), and a permanent mass storage device, such as a disk drive.

The memory 250 may store program code for a receiving routine 900 (see FIG. 9, discussed below), a barcode generation subroutine 1000 (see FIG. 10, discussed below), and an optional printing routine 260. In addition, the memory 250 also stores an operating system 255. These software components may be loaded from a non-transient computer readable storage medium 295, on which the software components are tangibly embodied, into memory 250 of the server 200 using a drive mechanism (not shown) associated with a computer readable storage medium, such as a floppy disc, tape, DVD/CD-ROM drive, memory card, or the like. In some embodiments, software components may also be loaded via the I/O communication interface 230, rather than via a computer readable storage medium 295.

In some embodiments, publisher 200 may also communicate via bus 220 with a database (not shown) or other local or remote data store. In various embodiments, bus 220 may comprise a storage area network ("SAN"), a high-speed serial bus, and/or via other suitable communication technology.

Figure 3:
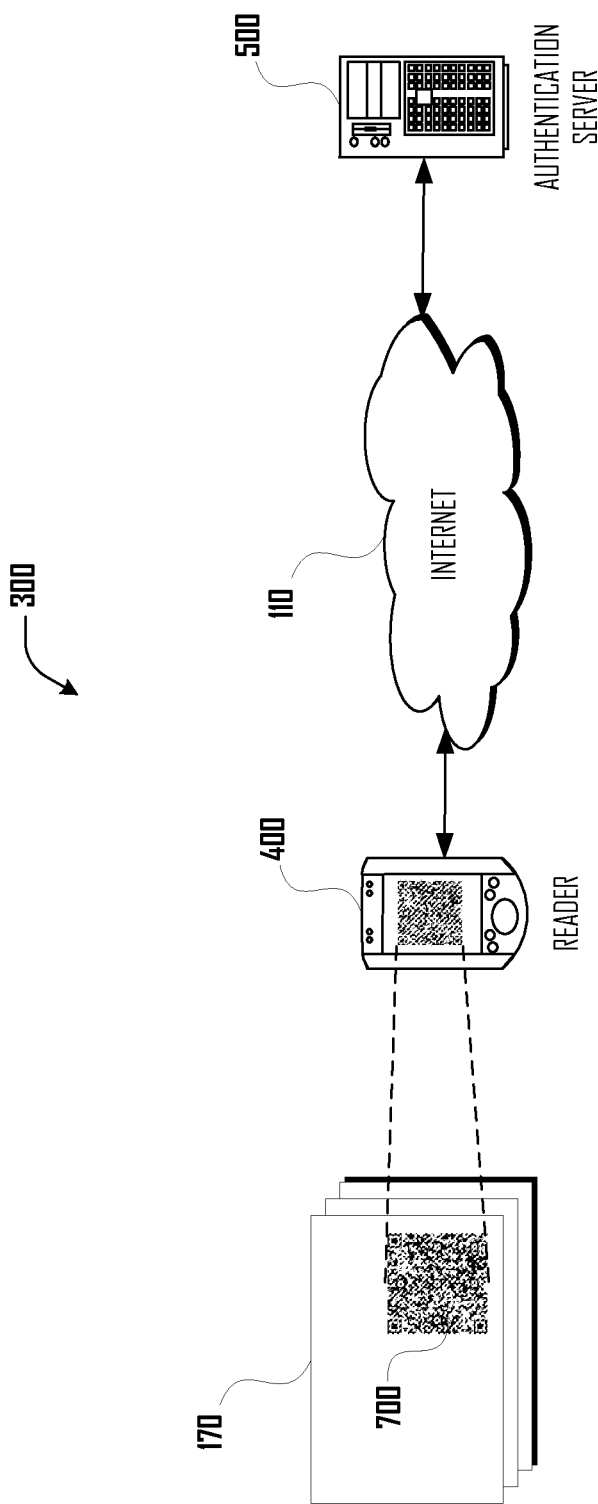
FIG. 3 illustrates a suitable operating environment for high-value document scanning systems in accordance with at least one embodiment.

Referring now to FIG. 3, a suitable operating environment 300 for high-value document authentication systems is shown in accordance with at least one embodiment. The environment 300 may include dynamic matrix or 2D barcode 700 embedded or affixed to a certified high-value document 170, document scanner/reader 400, and authentication server 500. In various embodiments, reader 400 sends a scan request to the authentication server 500 via communications network 110 and obtains a covert scan key associated with the certified document 170. Reader 400 uses the scan key to scan and decrypt the covertly readable barcode portion in the certified document. In one embodiment, decryption of the covertly readable barcode portion provides covert data that may include authentication information suitable to authenticate the certified document 170. For example, the covert data may provide a message digest of the whole page, such as a hash or digest of something representing a larger collection of information on the page.

Accordingly, if the actual collection of information on the page of the certified document 170 matches the message digest of the covert data, the reader 400 can assume the certified document 170 is a valid document or legitimate copy thereof. Simpler embodiments, such as those used for tax stamps or registration tags, may match other data found on the remainder of the certified document 170, such as date of issue or identification number.

In one embodiment, authentication server 500 maintains a high-value document database 120 accessible by a document publisher 200, reader 400, and/or other approved third party. The 2D barcode label 700 may implement a variety of different encoding mechanisms, including a QR code, Data-Matrix code, Aztec code, MaxiCode, Semacode tag, Cauzin Softstrip code, EZcode, High Capacity Color Barcode (HCCB), CyberCode, Mobile Multi Colored Composite (MMCC), Dot codes, PDF417 symbols, ShotCode, SPAR-QCode, WaterCode, Trusted Paper Key (TPK), and the like.

Figure 4:
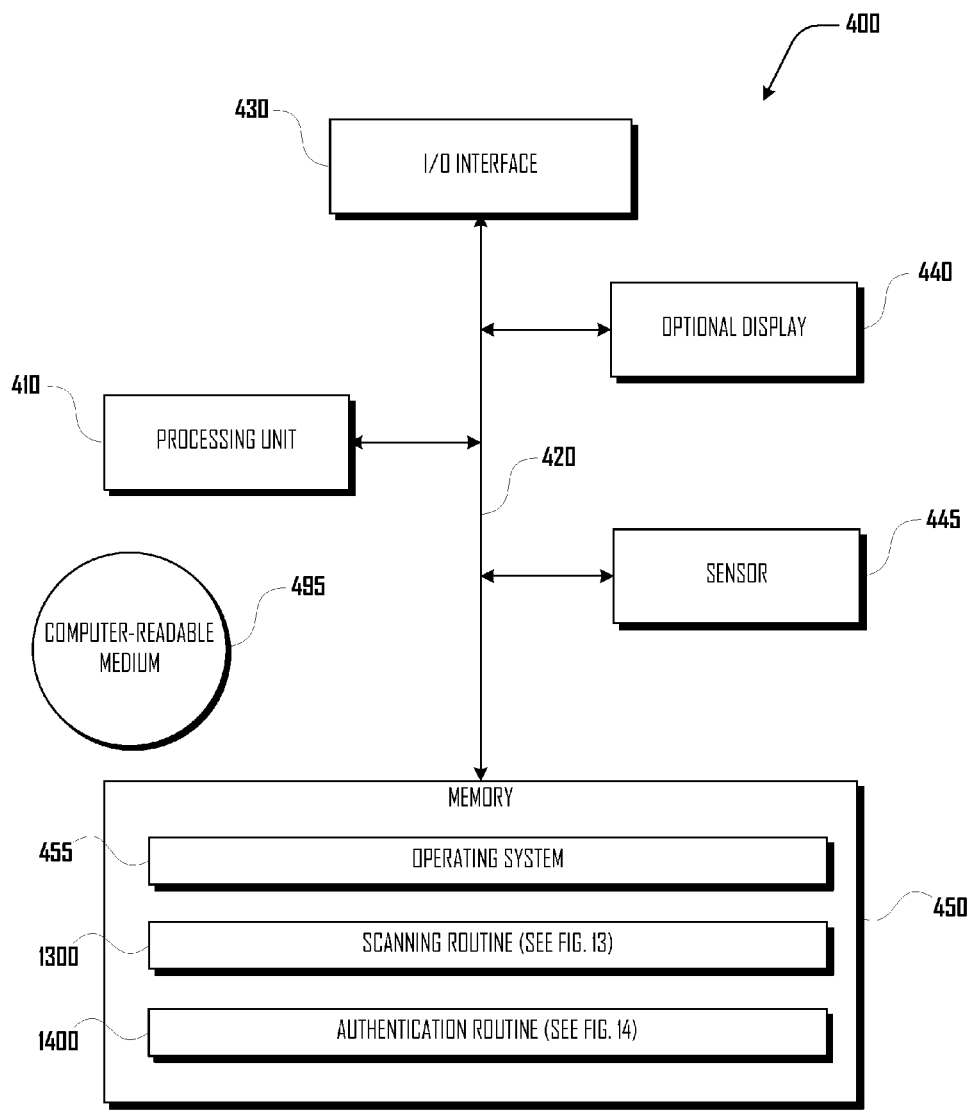
FIG. 4 illustrates several components of a high-value document scanner/reader in accordance with one embodiment.

Referring now to FIG. 4, several components of a high-value document scanner/reader 400 are shown in accordance with one embodiment. In some embodiments, reader 400 may include many more components than those shown in FIG. 4. However, it is not necessary that all of these generally conventional components be shown in order to disclose an illustrative embodiment. As shown in FIG. 4, the reader 400 includes an I/O communication interface 430 for connecting to the communications network 110.

The reader 400 also includes a processing unit 410, a memory 450, and an optional display interface 440, all interconnected along with the I/O communication interface 430 via a communication bus 420. The memory 450 generally comprises a random access memory ("RAM"), a read only memory ("ROM"), and a permanent mass storage device, such as a disk drive, flash device, or the like. The memory 450 stores program code for a number of applications, which includes executable instructions for scanning routine 1300 (see FIG. 13, discussed below) and authentication routine 1400 (see FIG. 14, discussed below). In addition, the memory 450 also stores an operating system 455. These software components may be loaded from a computer readable storage medium 495 into memory 450 of the reader 400 using a read mechanism (not shown) associated with a non-transient computer readable storage medium 495, such as a floppy disc, tape, DVD/CD-ROM drive, memory card, or the like. In some embodiments, software components may also be loaded via the I/O communication interface 430, rather than via a computer readable storage medium 495.

Although a reader 400 has been described that generally conforms to conventional general purpose computing devices, a reader 400 may be any of a great number of mobile client devices capable of communicating with the communications network 110 and obtaining applications, for example, a personal game console, a handheld computer, a cell phone, or any other suitable mobile device. In some embodiments, some or all of the systems and methods disclosed herein may also be applicable to non-mobile client devices, such as a personal computer, a set-top box, television, and the like.

Figure 5:
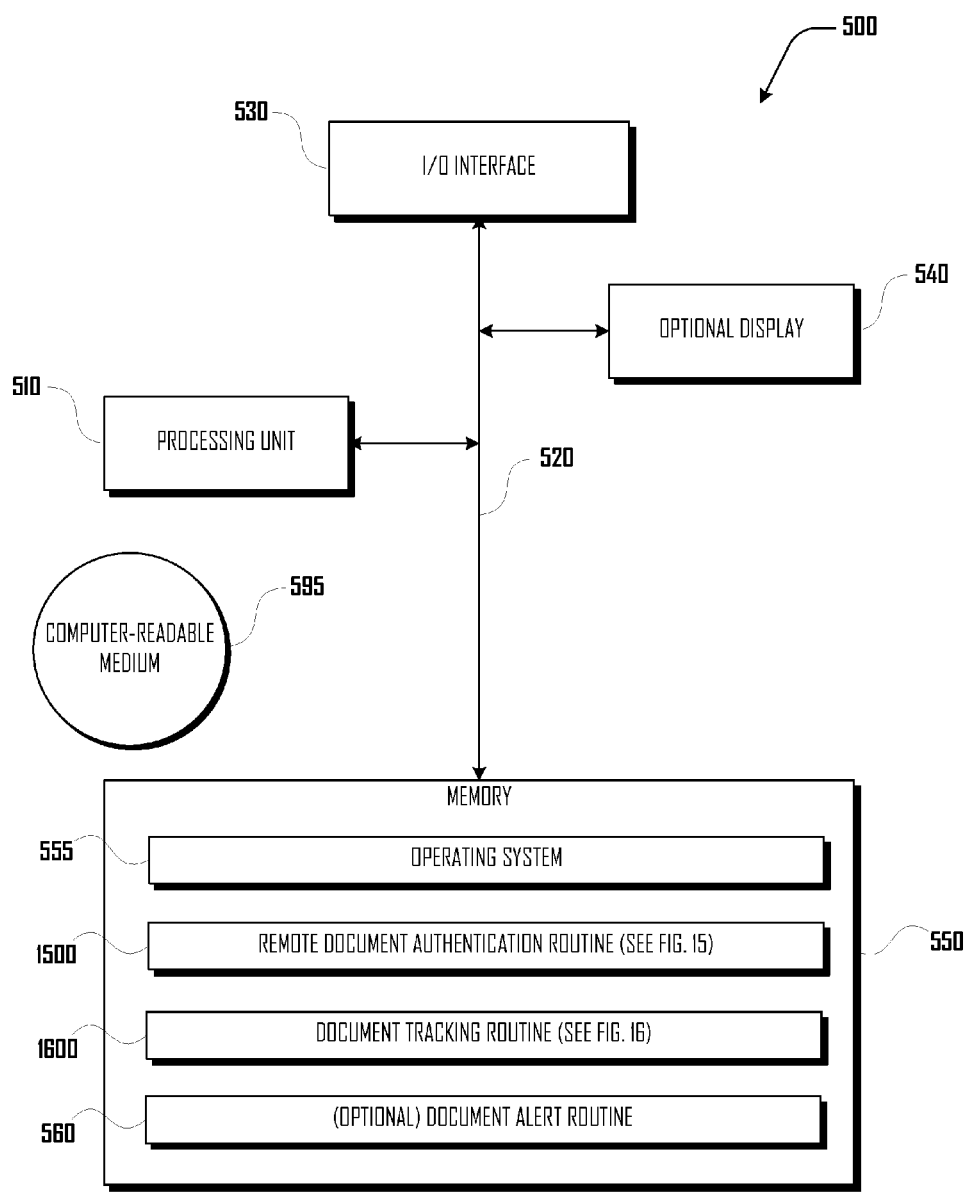
FIG. 5 illustrates several components of a high-value document authentication server in accordance with one embodiment.

Referring now to FIG. 5, several components of an authentication server 500 for high-value documents are shown in accordance with one embodiment. In some embodiments, authentication server 500 may include many more components than those shown in FIG. 5. However, it is not necessary that all of these generally conventional components be shown in order to disclose an illustrative embodiment. As shown in FIG. 5, the authentication server 500 includes an I/O communication interface 530 for connecting to the communications network 110. The authentication server 500 also includes a processing unit 510, a memory 550, and an optional display interface 540, all interconnected along with the I/O communication interface 530 via a communication bus 520. The memory 550 generally comprises a random access memory ("RAM"), a read only memory ("ROM"), and a permanent mass storage device, such as a disk drive, flash device, or the like. The memory 550 stores program code for a number of applications, which includes executable instructions for a remote document authentication routine 1500 (see FIG. 15, discussed below) and document tracking routine 1600 (see FIG. 16, discussed below). In one embodiment, the memory 550 may also store a document alert routine 560 to identify and/or set various alerts associated with a document. In addition, the memory 550 also stores an operating system 555. These software components may be loaded from a computer readable storage medium 595 into memory 550 of the authentication server 500 using a read mechanism (not shown) associated with a non-transient computer readable storage medium 595, such as a floppy disc, tape, DVD/CD-ROM drive, memory card, or the like. In some embodiments, software components may also be loaded via the I/O communication interface 530, rather than via a computer readable storage medium 595.

Although an authentication server 500 has been described that generally conforms to conventional general purpose computing devices, the authentication server 500 may be any of a great number of network devices capable of communicating with the communications network 110 and obtaining applications, for example, mainframes, minicomputers, workstations, personal computers, or any other suitable computing device. In some embodiments, some or all of the systems and methods disclosed herein may also be applicable to distributed network devices, such as cloud computing, and the like. Available cloud resources may include applications, processing units, databases, and file services. In this manner, the authentication server 500 enables convenient, on-demand network access to a shared pool of configurable high-value document certification, authentication, monitoring and tracking related computing services and resources (e.g., networks, servers, storage, applications, and services) that can be rapidly provisioned and released with minimal management effort or service provider interaction. These services may be configured so that any computer connected to the communications network 110 is potentially connected to the group of high-value document authentication applications, processing units, databases, and files or at the very least is able to submit certification requests, authentication scans, and/or access collected document alert information. In this manner, the barcode data maintained by authentication server 500 may be accessible in a variety of ways by a client device 400, for example, a personal computer, a portable scanner, a handheld computer, a cell phone, or any other device that is capable of accessing the internet 110.

Figure 6:
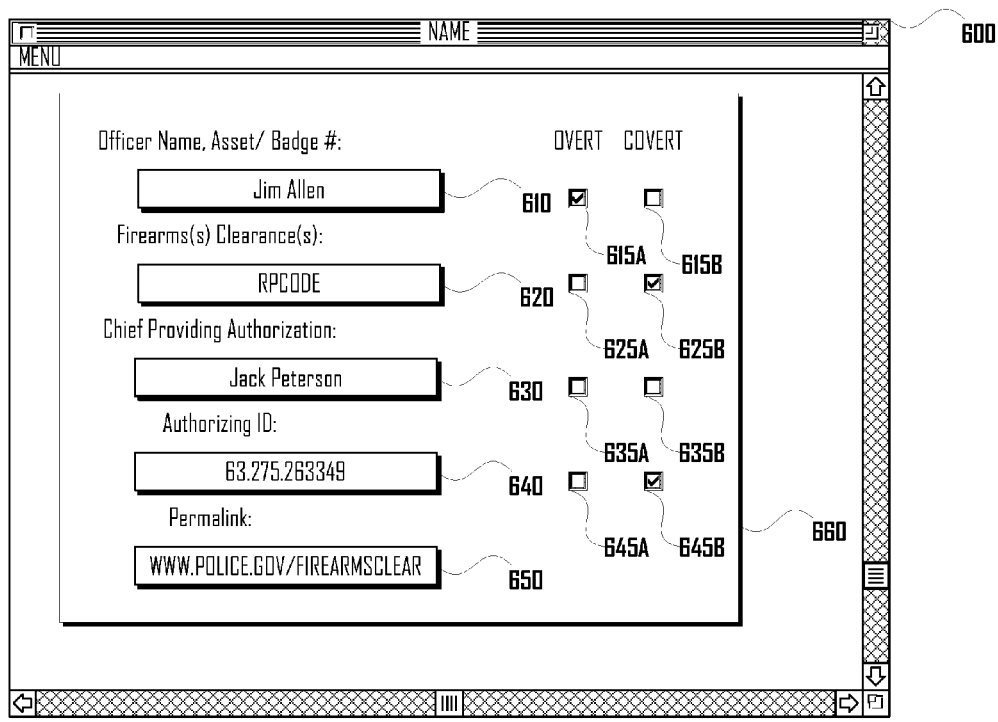
FIG. 6 illustrates a screenshot identifying overt/covert data for inclusion in barcode in accordance with one embodiment.

Referring now to FIG. 6, a screenshot 600 identifying overt data 615A, 625A, 635A, 645A and/or covert data 615B, 625B, 635B, 645B for inclusion in barcode is shown in accordance with one embodiment. Specifically, the illustrated barcode generation program 660 includes various document elements and associated customized document data fields, such as Officer Name/Badge Number 610, Firearm Clearance Level 620, Chief Providing Authorization 630, and Authorization Identification 640, and a source confirmation link 650. Each customized document data field may be designated as overt data 615A, 625A, 635A, 645A and/or covert data 615B, 625B, 635B, 645B.

Barcode data may originate from a variety of sources including, but not limited to, remote device 105, publisher 200, or other third party. Similarly, the potential components of a composite barcode, consisting of both overt data and covert data, may also be identified in a variety of different ways. For example, FIG. 6 illustrates a document composite barcode generation program 660 that identifies multiple document elements with associated document data fields in a potential high-value document. Each document data field may be individually identified for selective inclusion as overt/covert data in a composite barcode. Selecting the overt data and covert data from the customized document data fields allows each composite barcode to include information relatively unique to the source document.

While the illustrated embodiment in FIG. 6 allows for specific visually available document information to be selected as overt/covert data, other embodiments may automatically select and assign barcode data. In one embodiment, barcode data includes a hash or message digest representing a larger collection of information on the page. Other embodiments may incorporate additional data to authenticate the document drawn from outside of the "four corners" of the high-value document. For example, an identification document using a composite barcode, such as a passport or driver's license, may also request additional security information from the individual presenting the identification document. For example, in one embodiment, the overt data may indicate that one should ask a specific security question or provide a link to the security question, such as "What is your mother's maiden name?" or "What is your email address and telephone number?" The covert data may provide the answer or a link to the proper answer. Alternatively, the overt data and covert data may be unrelated to reduce the chance it could be accidentally discovered.

Referring now to FIG. 7A, a block diagram of a barcode 700 for a high-value document is shown in accordance with one embodiment. In one embodiment, the barcode 700 includes barcode data 740 having overt data 750 and/or covert data 760.

Referring now to FIG. 7B, a graphical illustration of a barcode 700B is shown with encoded barcode data 740B. The QR code illustrated in FIG. 7B only includes overt data 750 encoded into an overtly readable barcode portion 750B. By comparison, FIG. 7C is a graphical illustration of barcode 700C with encoded barcode data 740C. More specifically, the illustrated QR code in FIG. 7C includes both an overtly readable barcode portion 750C based on the same overt data 750 used in FIG. 7B and a covertly readable barcode portion 760C based on covert data 760. Accordingly, barcode 700C incorporates the covertly readable barcode portion 760C into redundant space associated with the overtly readable barcode portion 750C. In one embodiment, the redundant space associated with the overtly readable barcode portion 750C is reserved by an error-correcting code configured to detect and to correct encoding graphical/symbolic errors in the barcode of the overtly readable barcode portion 750C. The error-correcting code may be any multi-burst bit-error correcting code, such as a Reed-Solomon code. Other acceptable error correcting code types that may be used in conjunction with a 2D barcode symbolic encoder include varieties of turbo codes, LDPC (Low-Density Parity-Check) codes, Convolutional codes, ECC, AN codes, BCH codes, Fountain codes, Golay codes, Goppa codes, Group codes, Hadamard code, Hagelbarger code, Hamming codes, Latin square based codes, Lexicographic codes, Long codes, LT codes, constant weight codes, RA codes, Raptor codes, Reed-Muller codes, Tornado codes, Walsh-Hadamard codes, and other FEC codes.

Once encoded and/or encrypted the barcode 700C includes two types of readable data, an overtly readable barcode portion 750C and a covertly readable barcode portion 760C. While the overtly readable barcode portion 750C remains readable by a conventional barcode reader configured to read a designated QR barcode, the covertly readable barcode portion 760C is unreadable without additional detection software/service, such as those provided by Pagemark Technology, Inc. (http://www.pagemarktechnology.com). In one embodiment, the covertly readable barcode portion 760C includes encrypted covert data 760 that may only be read by a barcode reading device using an appropriate covert scan key. In one embodiment, the covert scan key may be obtained from a remote device, such as an authentication server 500.

Figure 8:
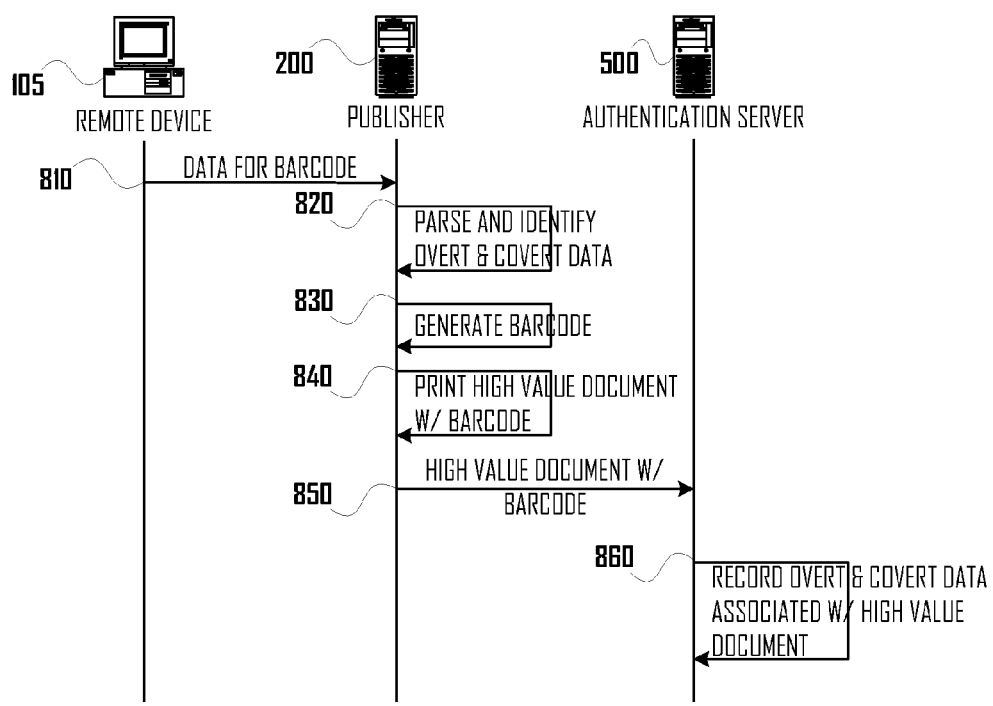
FIG. 8 illustrates a series of communications between various devices generating a barcode for a high-value document in accordance with one embodiment.

Referring now to FIG. 8, a series of communications between remote device 105, publisher 200, and authentication server 500 is shown in accordance with one embodiment. The illustrated series of communications shows one scenario in which publisher 200 generates a barcode for a high-value document. The illustrated sequence of events is provided as an example for illustrative purposes. In other embodiments, a similar barcode publication process may be obtained via a different sequence of events.

Beginning the illustrated sequence of operations, remote device 105 submits 810 data for inclusion in a barcode to publisher 200. Typically, the submission process also includes sending at least one of overt data and covert data, which will eventually be used to generate a barcode. The submission process may also include selection of a 2D barcode type to encode the overt/covert data. In one embodiment, the data submission also includes identification of a suitable encryption key to be used to encrypt the covert data.

Upon receiving the data for incorporation into the barcode, publisher 200 parses 820 overt data and covert data. Typically, the parsing process includes identifying overt data and covert data. As previously illustrated in FIG. 6, the overt data and covert data may already be identified by the remote device 105 and need only be separated by the publisher 200. Alternatively, publisher 200 may independently identify and select overt data and covert data. For example, publisher 200 may select overt data and covert data based on content of the high-value document to be published.

Upon parsing the data, publisher 200 generates 830 a barcode based on the overt data and covert data. In particular, the publisher 200 encodes overt data into an overtly readable barcode portion and covert data into a covertly readable barcode portion. The covertly readable barcode portion being unreadable by a standard configuration of a 2D barcode scanner. One illustrative example of the barcode generating process is described in greater detail in FIG. 10 below.

Upon generating the barcode, publisher 200 incorporates the generated barcode with other content of a high-value document and prints 840 a certified high-value document representing the combination of barcode and high-value document content. In one embodiment, printing includes physical publication and electronic publishing. Upon printing, publisher 200 delivers 850 a copy of the certified high-value document to the authentication server 500.

Upon obtaining a certified high-value document, authentication server 500 records 860 the identifying document information in an authentication database. The authentication database may track a variety of identifying document information including overt data and covert data extracted from the barcode. In one embodiment, a copy of the barcode is also included in the authentication database. In one embodiment, the document information includes, among other items, a complete copy of the certified high-value document.

Figure 9:
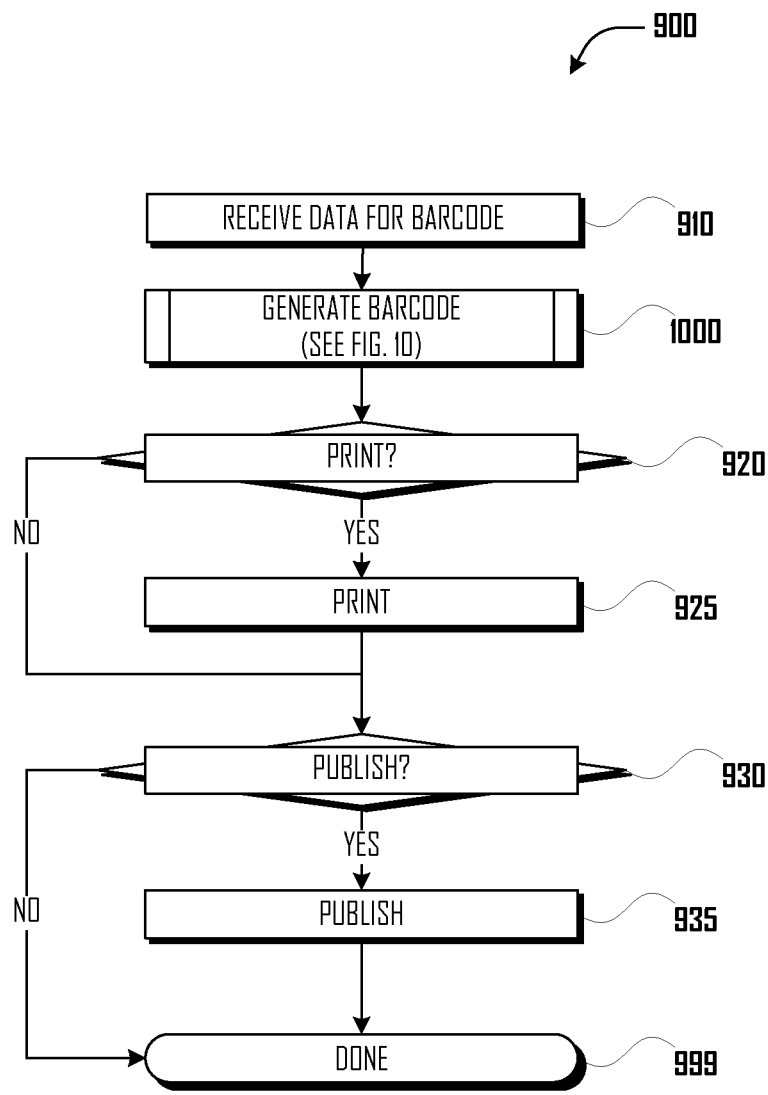
FIG. 9 illustrates a flow diagram of a receiving routine for the high-value document publisher shown in FIG. 2 in accordance with one embodiment.

Referring now to FIG. 9, a flow diagram of a receiving routine 900 is shown such as may be performed by a publisher 200 in accordance with one embodiment. In some embodiments, routine 900 may be performed by a remote publisher application installed on either a remote client device 105 or authentication server 500.

In block 910, routine 900 obtains data for the barcode. For example, in one embodiment, routine 900 receives barcode information such as 2D barcode type, encoding and encryption keys, and message payload. The received data for the barcode may even identify overt data and covert data.

In subroutine block 1000 (see FIG. 10, discussed below), routine 900 generates a barcode. In one embodiment, the generating process for the barcode may include obtaining document data, parsing document data into a combination of overt data and covert data, generating an overtly readable barcode portion based on the overt data and inserting a covertly readable barcode based on the covert data into redundant space of the overtly readable barcode portion.

In query block 920, routine 900 determines whether the generated barcode should be printed. If not, routine 900 continues to query block 930. Otherwise, routine 900 prints the barcode in block 925. In one embodiment, a certified document is printed representing a combination of barcode and high-value document data. The resulting combination may be "fixed" in a variety of tangible mediums that are sufficiently permanent or stable to permit the certified high-value document to be perceived, reproduced, or otherwise communicated to others for a period of more than transitory duration.

In query block 930, routine 900 determines whether the generated barcode should be electronically published. If not, routine 900 continues to block 999 and ends. Otherwise, routine 900 electronically publishes the barcode in block 935. In one embodiment, a certified document is electronically published as an electronic document or image representing the combination of barcode data and high-value document data. The resulting combination may then be electronically transmitted and/or maintained to permit the certified high-value document to be perceived, reproduced, or otherwise communicated to others for a period of time. In one embodiment, the routine 900 ends after publishing in block 999.

Figure 10:
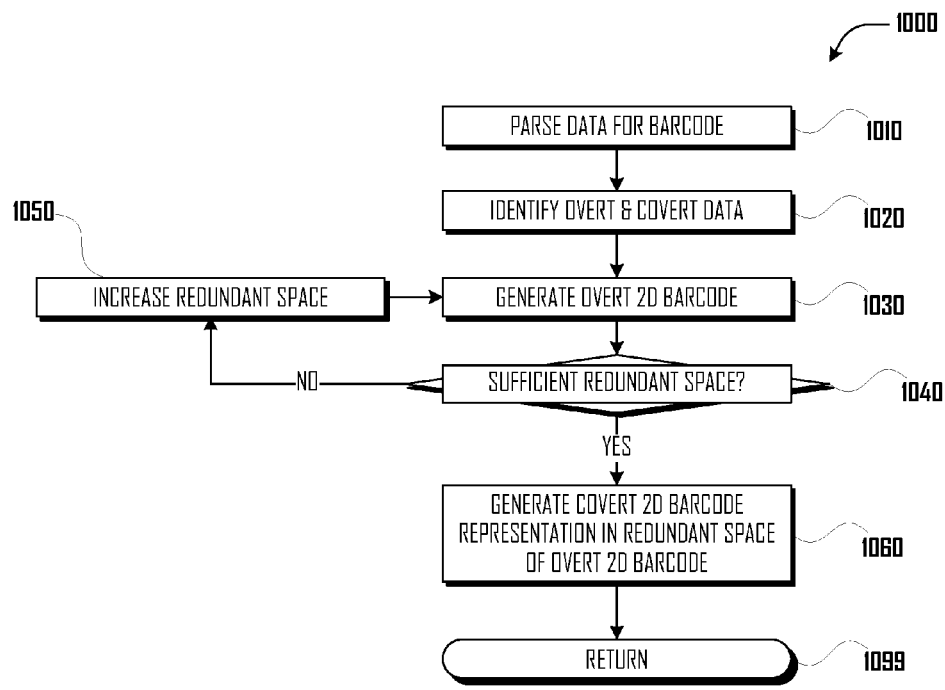
FIG. 10 illustrates a flow diagram of a barcode generation subroutine in accordance with one embodiment of the receiving routine shown in FIG. 9.

Referring now to FIG. 10, a flow diagram of a barcode generation subroutine 1000 is shown such as may be performed by a publisher 200 in accordance with one embodiment. In some embodiments, routine 700 may be alternatively be performed by a remote generation application installed on either a remote client device 105 or authentication server 500.

In block 1010, subroutine 1000 conducts lexical analysis on data obtained for the creation of a barcode. In one embodiment, subroutine 1000 initially parses document data into at least one document message packet and barcode data. The barcode data may include 2D barcode parameters including barcode type, message payload, and error correction level. The error correction level often establishes the amount of redundant space included when creating a 2D barcode. For example QR codes set an ECLevel parameter to one of four levels (e.g., L, M, Q, H), where each level represents the how much redundant information may be used to recover errors in data (e.g., L=7%, M=15%, Q=25%, H=30%). In block 1020, routine identifies overt data and covert data within the barcode data. As previously illustrated in FIG. 6, the overt data and covert data may have already been identified by a remote device 105. Alternatively, subroutine 1000 may independently identify and select overt data and covert data from the document data. For example, subroutine 1000 may select and assign overt data and/or covert data based on document content, a hash, or a message digest.

In block 1030, subroutine 1000 generates a 2D barcode. In one embodiment, the generated 2D barcode is overt data encoded into a graphical or symbolic 2D barcode representation, thereby creating an overtly readable barcode portion. In query block 1040, subroutine 1000 determines whether sufficient redundant space exists for incorporation of a covert 2D barcode portion based on the covert data into the generated overt 2D barcode. If not, subroutine 1000 increases available redundant space in block 1050. In one embodiment, subroutine 1000 may increase available redundant space by increasing the size of the 2D barcode. In one embodiment, subroutine 1000 may increase the available redundant space by changing the error-correction level. For example, if the 2D barcode is a QR code, then the subroutine 1000 could increase an ECLevel parameter associated with the QR code from L to M or from M to Q or from Q to H.

Otherwise, when sufficient redundant space is available in query block 1040, subroutine 1000 generates in block 1060 a 2D barcode including a covert barcode portion and an overt barcode portion. In one embodiment, the covert data may be encrypted and encoded into a graphical or symbolic 2D barcode representation creating the covertly readable barcode portion. The covertly readable portion being unreadable to a standard barcode reader capable of reading the overtly readable barcode portion. In one embodiment, the covert barcode portion is hidden within available redundant space associated with the overt 2D barcode. Alternatively, the covertly readable portion is inserted over the overtly readable portion in manner that enables the overt data to be recovered using error-correction.

In one embodiment, the covertly readable barcode portion is inserted as an error burst in the overtly readable barcode portion such that said overtly readable barcode portion will be corrected by said barcode reader using redundant data. Each error burst represents a contiguous sequence of symbols associated with the covertly readable barcode portion, such that the first and last symbols are in error relative to the overtly readable barcode portion and there exists no contiguous subsequence of correct symbols associated with the overtly readable barcode portion within the error burst.

In one embodiment, the resulting generated barcode is a QR code based on identified overt data. Typically, the QR code will include version information, format information, at least one data key, at least one error correction key, positional pattern, alignment pattern, and a timing pattern. As previously indicated the QR code generator may also designate an error correction level that determines how much redundant information may be used to recover errors. In one embodiment, subroutine 1000 generates an overtly readable QR code barcode portion based on the overt data and inserts a covertly readable QR code barcode portion based on the covert data in available redundant space of the overtly readable QR code barcode portion. Alternatively, subroutine 1000 could directly insert the covertly readable QR code barcode portion into the overtly readable QR code barcode portion and rely on the respective QR code error-correction mechanisms to restore/maintain the overt data. Subroutine 1000 returns to the calling routine in block 1099.

Figure 11:
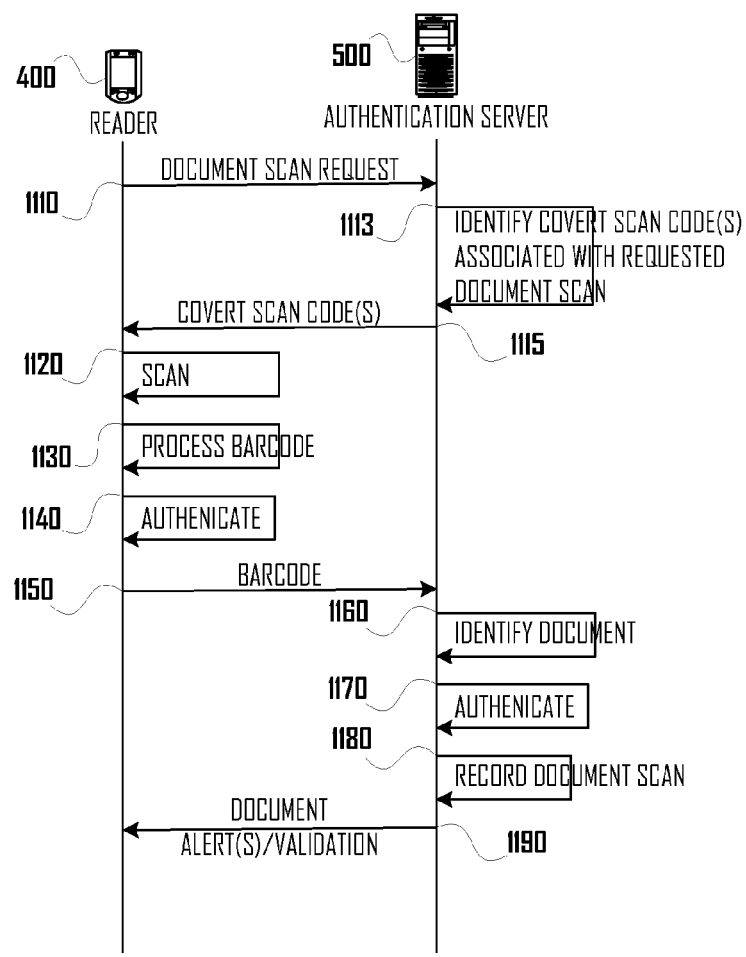
FIG. 11 illustrates a series of communications between various devices reading a barcode for a high-value document in accordance with one embodiment.

Referring now to FIG. 11, a series of communications between barcode reader 400 and authentication server 500 are shown in accordance with one embodiment. The illustrated series of communications shows one scenario in which reader 400 reads a barcode associated with a high-value document and the combination of reader 400 and authentication server 500 authenticate the high-value document based on data recovered from the barcode. The illustrated sequence of events is provided as an example for illustrative purposes. In other embodiments, a similar barcode scanning and document authentication process may be obtained via a different sequence of events.

Beginning the illustrated sequence of operations, barcode reader 400 submits 1110 a document scan request to authentication server 500. Depending on the reader 400 configuration, this document scan request may occur during a singular configuration stage, a periodic initialization stage, or be made regularly with every different document scan.

Upon receiving the document scan request, authentication server 500 identifies 1113 covert scan codes associated with the requested document scan and transmits 1115 the covert scan codes to the reader 400. In one embodiment, reader 400 may obtain a covert scan key associated with a particular certified document. Reader 400 may use the scan key in combination with traditional scan keys to scan 1120 the certified document. Reader 400 processes 1130 the scanned barcode information to identify, decode, and where necessary decrypt the overtly readable barcode portion into overt data and the covertly readable barcode portion into covert data. In one embodiment, decryption of the covertly readable barcode portion provides covert data that may include authentication information suitable for the reader 400 to authenticate 1140 the certified document. For example, the covert data may provide a message digest, such as a hash or digest representing a larger collection of information on the page. In one embodiment, the reader 400 reveals an authentication code that must be present somewhere on the face of the document being scanned. Alternatively, the reader 400 may uncover an authentication password or passphrase that should be known by the bearer of the document.

Reader 400 may also submit 1150 a copy of the scanned barcode to the authentication server 500 for additional remote authentication. Remote authentication may be useful in a variety of circumstances, counterfeiting in particular becomes even more challenging as the authentication information is not revealed locally. As such, a potential counterfeiter would have to have control both a reader 400 and an authentication server 500 to obtain all of the authentication information. Upon receiving the barcode information, authentication server 500 identifies 1160 and authenticates 1170 the document. Authentication server 500 may also record 1180 the document scan to track transactions of a particular document. If the remote authentication fails or the scan triggers a notification, authentication server submits 1190 a document alert to the reader 400. Otherwise authentication server 1190 submits 1190 a document validation to the reader 400.

Figure 12:
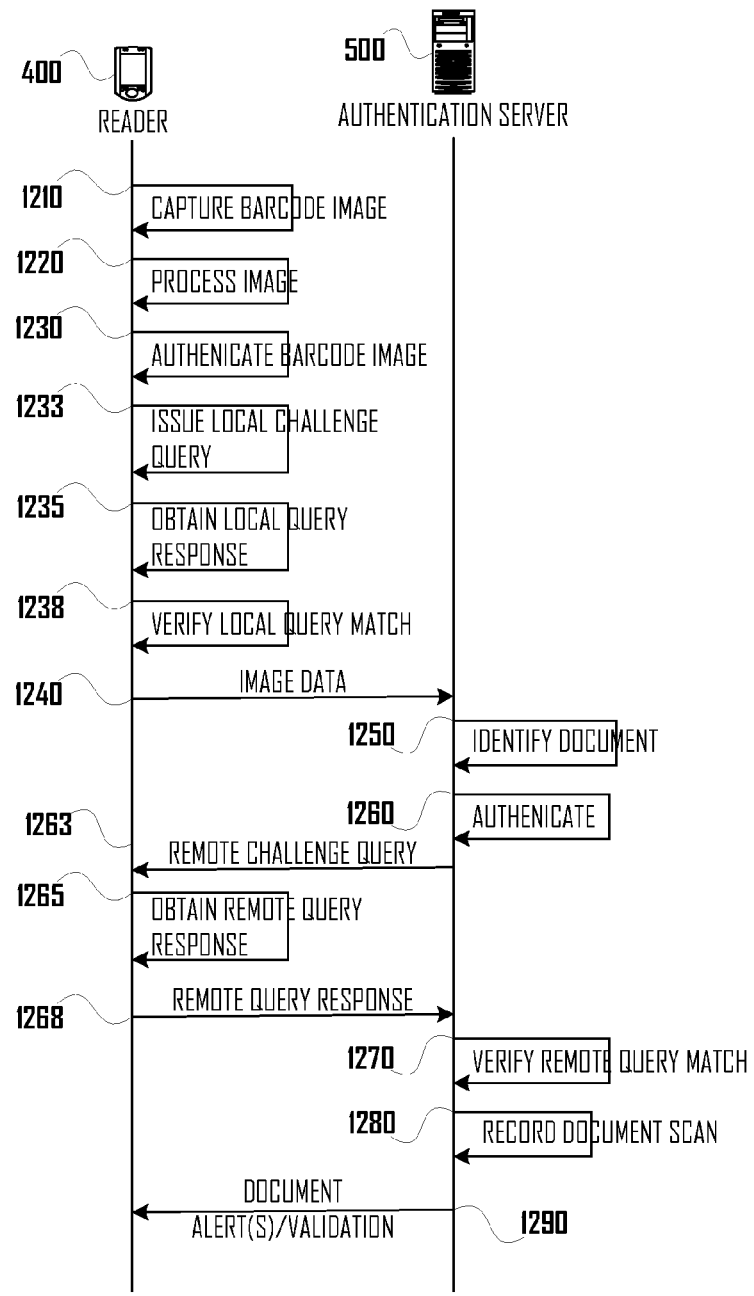
FIG. 12 illustrates a series of communications between various devices capturing a barcode image for a high-value document in accordance with one embodiment.

Referring now to FIG. 12, a series of communications between barcode reader 400 and authentication server 500 are shown in accordance with one embodiment. The illustrated series of communications shows one scenario in which barcode reader 400 captures a barcode image for a high-value document and the combination of barcode reader 400 and authentication server 500 reads the image of the barcode to authenticate the high-value document based on information gleaned from the barcode. The illustrated sequence of events is provided as an example for illustrative purposes. In other embodiments, a similar barcode image capturing and document authentication process may be obtained via a different sequence of events.

Beginning the illustrated sequence of operations, barcode reader 400 captures 1210 a barcode image. Reader 400 processes 1220 the captured barcode image to identify, decode, and where necessary decrypt, the overtly readable barcode portion into overt data and the covertly readable barcode portion into covert data. The overt data and covert data may include authentication information suitable for the reader 400 to locally authenticate 1230 the certified document. In one embodiment, the reader 400 reveals a local challenge query that may be issued 1233 to the operator of the reader 400 and/or to the bearer of the document to be authenticated. The local challenge query may include an authentication password or passphrase that should either be known by the bearer of the document or found by the operator of the reader within the document. The reader 400 obtains 1235 the local query response and verifies 1238 a local query match. In one embodiment, if the local match fails a document alert is set and notification provided to the operator of the reader 400. Otherwise, reader 400 submits 1240 a copy of image data to the authentication server 500.

The authentication server 500 identifies 1250 the document associated with the barcode image. In one embodiment, the authentication server 500 authenticates 1260 the barcode image and determines whether remote authentication is necessary. Authentication server 500 issues a remote challenge query 1263 to the reader 400. The remote challenge query may include an authentication password or passphrase that should either be known by the bearer of the document or found by the operator of the reader within the document. Alternatively, the remote challenge query may provide a message digest, such as a hash or digest representing a larger collection of information on the page that should match the scanned document. It is anticipated that a variety of other local and remote challenge queries may be made to validate and authenticate the scanned document. For example, in one embodiment, a document challenge query may actually be a combination of both a local challenge query and a remote challenge query.

Upon obtaining 1265 a response to the remote challenge query, reader 400 submits 1268 the remote query response to the authentication server 500. The authentication server 500 verifies 1270 a match of the received remote query response with the anticipated response. In one embodiment, the authentication server 500 may also determine whether any pre-existing alerts were set for the identified document. The authentication server 500 records 1280 the validation/invalidation of the document and submits 1290 any resulting document alerts or document validation to the reader 400. Having been notified (or otherwise determining) document authenticity, the reader 400 may instruct the operator accordingly.

Figure 13:
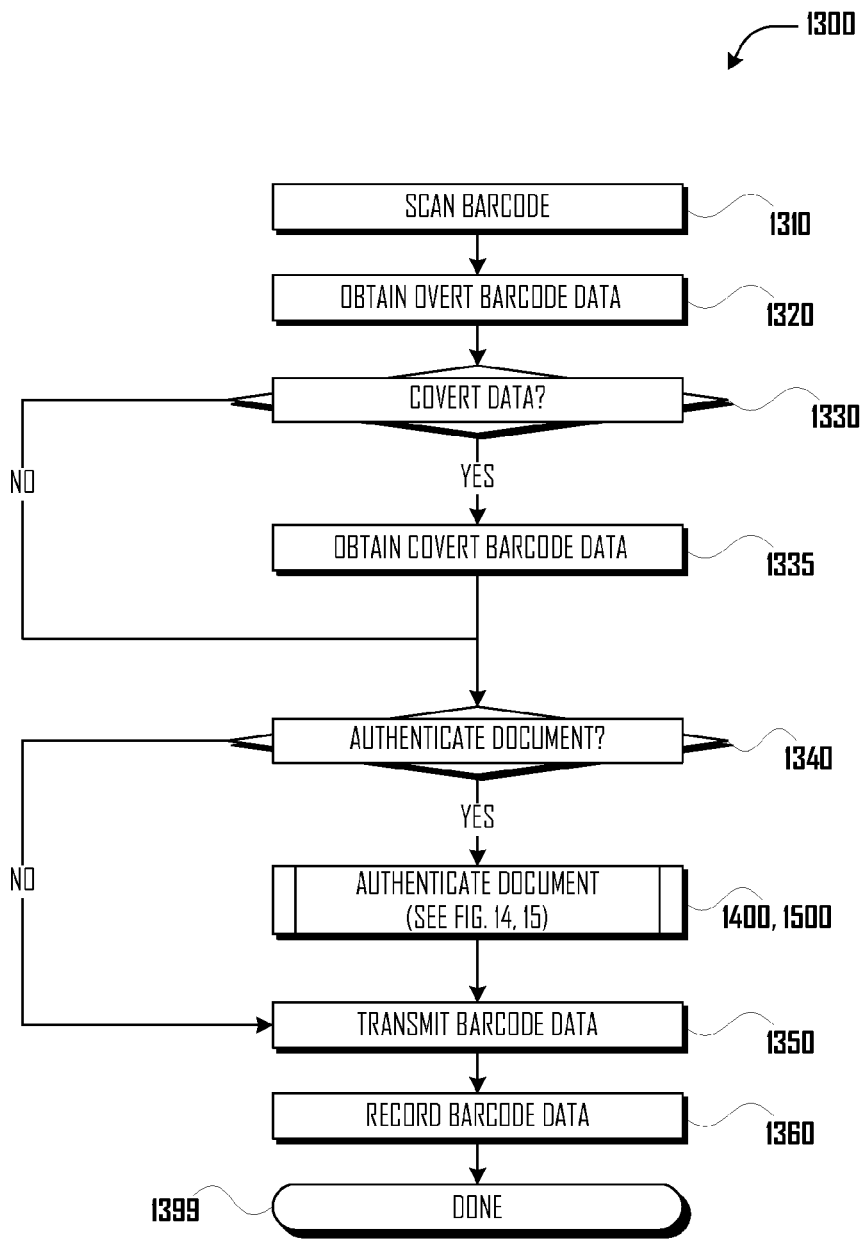
FIG. 13 illustrates a flow diagram of a scanning routine for the high-value document reader shown in FIG. 4 in accordance with one embodiment.

Referring now to FIG. 13, a flow diagram of a scanning routine 1300 is shown, such as may be performed by the high-value document reader 400 shown in FIG. 4 in accordance with one embodiment. Beginning in block 1310, routine 1300 scans a barcode. Routine 1300 obtains overt barcode data from the scanned barcode in block 1320. In query block 1330, routine 1300 determines whether the scanned barcode includes covert data. If no covert data is detected, routine 1300 continues to block 1340. Otherwise routine 1300 obtains the detected covert data from the scanned barcode in block 1335.

Routine 1300 determines based on the overt and/or covert data whether the scanned barcode also indicates that the document should be authenticated in query block 1340. If no authentication is necessary, routine 1300 continues to block 1350. Otherwise, in subroutine block 1400 (see FIG. 14, discussed below) or, alternately, subroutine 1500 (see FIG. 15, discussed below), routine 1300 authenticates the document.

In block 1350, routine 1300 transmits barcode data to an authentication server. In one embodiment, the transmitted barcode data may be used for remote authentication and/or registration of the certified document. In block 1360, routine 1300 records barcode data. The barcode data may be stored in memory locally, remotely, or both. Document activity may be tracked by periodically scanning a 2D barcode affixed to a particular document. For example, by recording information available to the reader one might also be able to determine both the current location and past locations of a document. In one embodiment a document scan may also include environmental information not associated with the barcode being scanned including GPS coordinates, ZIP code information, area code information, network information, and/or other relative geographical information that may be derived from the barcode scanner/reader. Upon completing the barcode reading process, routine 1300 continues to block 1399 and ends.

Figure 14:
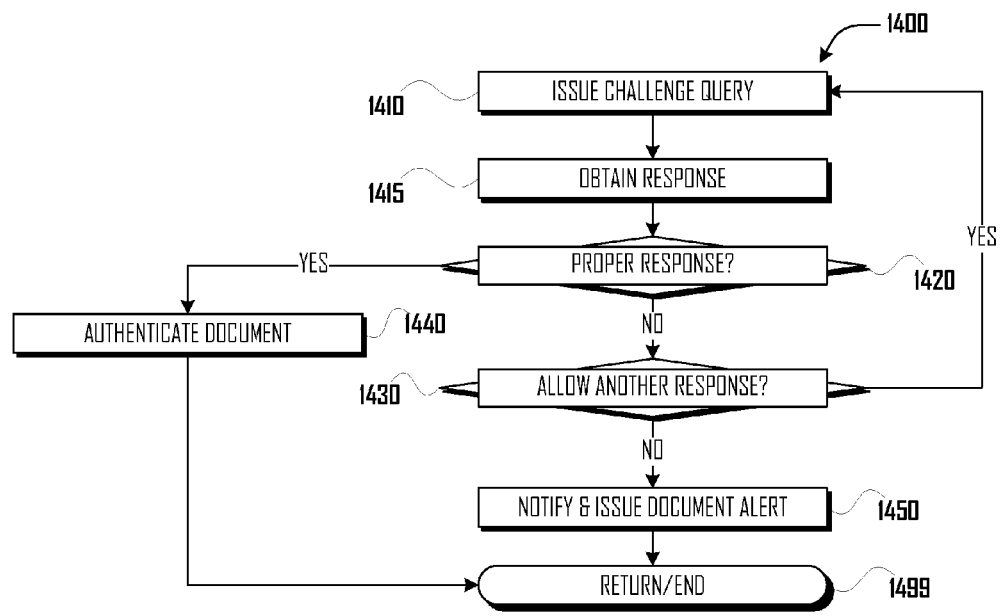
FIG. 14 illustrates a flow diagram of an authentication subroutine in accordance with one embodiment of the scanning routine shown in FIG. 13.

Referring now to FIG. 14, a flow diagram of an authentication routine 1400 is shown in accordance with one embodiment. Beginning in block 1410, routine 1400 issues a challenge query based on available overt and covert data obtained from the barcode. The routine 1400 obtains a response to the challenge query in block 1415. In one embodiment, the response is input received from an operator of the barcode scanner. Alternatively, the response may be a result obtained from a document property, such as an embedded message digest, document author, or document bearer. In yet another embodiment, the response may represent data stored in memory associated with the document identified in the initial scan.

In query block 1420, routine 1400 determines whether a proper response was received. If not, routine 1400 continues to block 1430. Otherwise routine 1400 authenticates the document in block 1440 and returns in block 1499. In query block 1430, routine 1400 determines whether additional responses are allowed. If allowed, routine 1400 returns to block 1410 and issues a challenge query, that may or may not be the same as the original challenge query. Otherwise, routine 1400 continues to block 1450 where a failed document authentication notification is made for the document being scanned and a document alert is issued for the document associated with the barcode. Routine 1400 continues to block 1499 and ends/returns.

Figure 15:
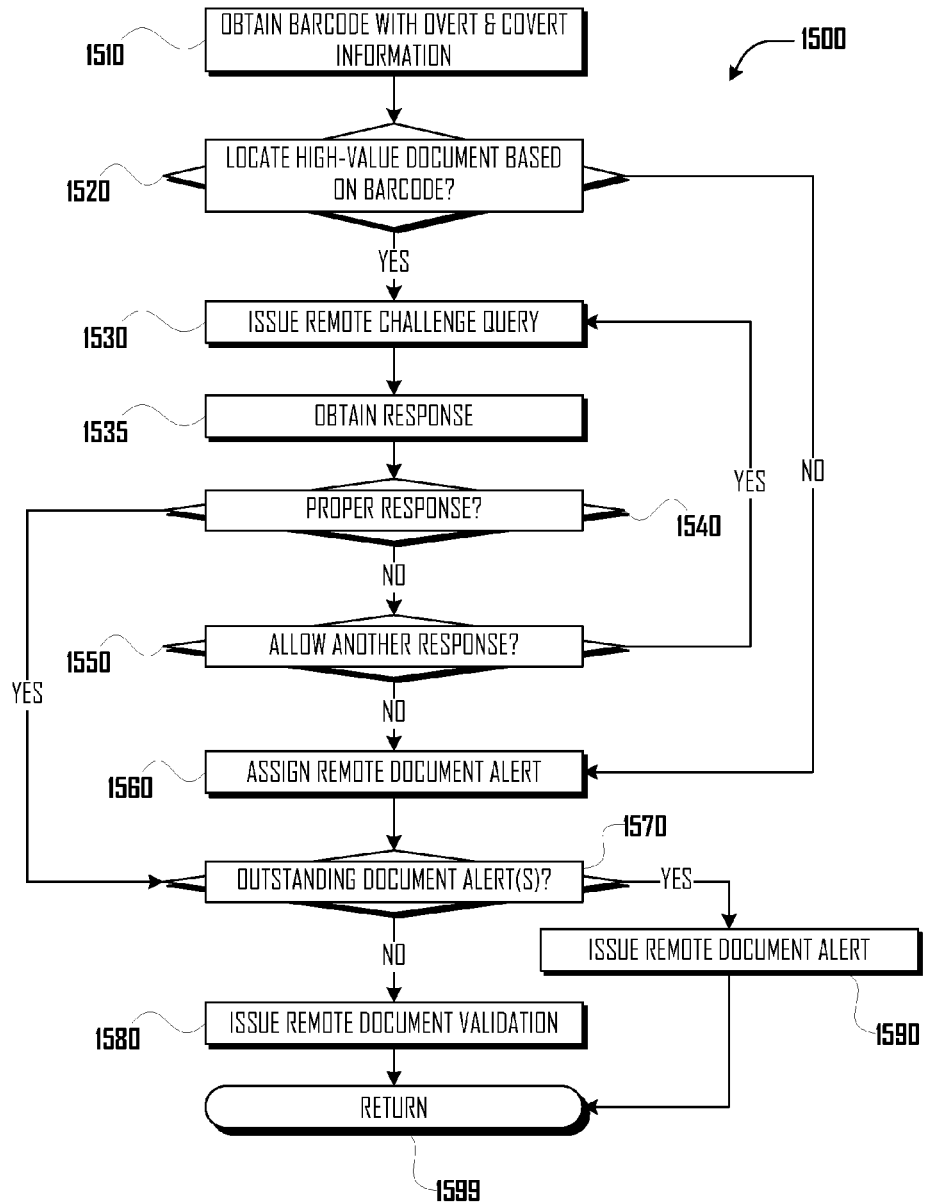
FIG. 15 illustrates a flow diagram of a remote authentication subroutine of the scanning routine shown in FIG. 13 for use by the high-value document server shown in FIG. 5 in accordance with one embodiment.

Referring now to FIG. 15, a flow diagram of a remote authentication subroutine 1500 is shown of the scanning routine shown in FIG. 13 for use by the high-value document server shown in FIG. 5 in accordance with one embodiment. Beginning in block 1510, subroutine 1500 obtains a barcode having embedded overt and covert information. In query block 1520, subroutine 1500 determines whether information about a certified high-value document can be located in a database based on the barcode information. If not, subroutine 1500 continues to block 1560. Otherwise, subroutine 1500 continues to block 1530 and issues a remote challenge query associated with the certified high-value document. Subroutine 1500 obtains a response to the query in block 1535.

In query block 1540, subroutine 1500 determines whether a proper response was received. If not, subroutine 1500 continues to query block 1550. Otherwise subroutine 1500 continues to query block 1570. In query block 1550, subroutine 1500 determines whether another response is allowed. If not, subroutine 1500 continues to 1560. Otherwise subroutine 1500 returns to block 1530. In block 1560, subroutine 1500 assigns a remote document alert to any document associated with the presented barcode, including the document presented for authentication.

In query block 1570, subroutine 1500 checks for any outstanding document alerts associated with the presented barcode. If none are found subroutine 1500 issues a remote document validation in block 1580. Otherwise subroutine 1500 issues a remote document alert in block 1590. Either way, subroutine 1500 continues to block 1599 and returns.

Referring now to FIG. 16, a flow diagram of a document tracking routine 1600 is shown for a high-value document server shown in FIG. 5 in accordance with one embodiment. Beginning in block 1610, routine 1600 receives a barcode scan request for a certified document. Routine 1600 identifies encryption associated with the barcode in block 1615 and transmits a covert decryption code in block 1620.

In block 1630, routine 1600 obtains a barcode with overt and covert information. In query block 1640, routine 1600 determines whether document information for a certified high-value document may be located based on the obtained barcode. If not, routine 1600 continues to query block 1650. Otherwise routine 1600 continues to block 1680 to optionally record the document scan activity along with other available scan information and further continues to block 1699 to end.

In query block 1650, routine 1600 determines if a new high-value document barcode has been presented. If not, routine 1600 continues to block 1670 and generates a document alert for the document associated with the barcode. Otherwise, routine 1600 creates a record for the new barcode and associates the barcode with the presented high-value document in block 1660. In block 1680, routine 1600 optionally records the barcode scan activity. Routine 1600 ends in block 1699.

Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for generating and certifying a certified version of a document, the method comprising:
   receiving a request to publish a certified document;
   receiving, by a document generator, document data from a remote device, the document data comprising document identification data and encrypted document authentication data;
   generating, by said document generator, a two dimensional barcode with the encrypted document authentication data embedded as errors within document identification data by:
      generating a first barcode portion having first data elements, the first data elements formatted to include the encrypted document identification data and error correction data, and
      inserting errors in non-contiguous subsections of the first data elements to encode a covert data layer within the first barcode portion, the covert data layer forming a second barcode portion having second data elements embedded as errors in the first data elements of the first barcode portion, the second data elements based on the encrypted document authentication data,
   wherein the document identification data is readable by a first barcode reader using the error correction data to restore the first data elements of the first barcode portion, and
   wherein the encrypted document authentication data is readable by a second barcode reader configured to identify and combine the errors in the non-contiguous subsections of the first data elements to form the encrypted document authentication data; and
   affixing the two dimensional barcode with the document to form a certified document, the second barcode portion providing document authentication data to configured barcode readers to verify authenticity of the certified document, and wherein said document has data separate from the document identification data and encrypted document authentication data;
   storing, by an authentication server, a decryption key for the encrypted document authentication data as associated with the certified document
   receiving a document authentication request from a remote device for the certified document;
   identifying the decryption key associated with the certified document;
   transmitting the decryption key or decrypted document authentication data to the remote device.

2. The method of claim 1, wherein the generating further comprises incorporating the second barcode portion into redundant space associated with said overtly readable barcode portion.

3. The method of claim 1, wherein the barcode is a 2D barcode.

4. The method of claim 3, wherein the 2D barcode is selected from the group consisting of QR code, DataMatrix code, Aztec code, MaxiCode, Semacode tag, Cauzin Softstrip code, EZcode, HCCB, CyberCode, MMCC, Dot codes, PDF417 symbols, ShotCode, SPARQCode, WaterCode, and TPK.

5. The method of claim 1, wherein the incorporating to form the certified document certifying includes printing the document with the generated barcode.

6. The method of claim 1, wherein the affixing to form the certified document certifying includes publishing the document with the generated barcode affixed.

7. A non-transient computer-readable medium having tangibly stored thereon instructions that, when executed by a processor, perform the method of claim 1.

8. A computing apparatus comprising a processor and a memory having stored thereon instructions that, when executed by the processor, perform the method of claim 1.

9. A computer-implemented method for generating a certified version of a document, the method comprising:
   obtaining, by a document generator, a document certification request having document data from a remote device, wherein said obtained document data comprises document identification data and document authentication data;
   generating, by said document generator, a barcode with encrypted document authentication data embedded as errors within the document identification data by:
      generating first data elements based on the document identification data, and embedding second data elements based on the encrypted document authentication data into redundant space of the first data elements as errors to form a covert data set, wherein second data elements are unreadable to a first barcode reader using an error-correcting code and the first data elements of the barcode are readable to the first barcode reader, and wherein said redundant space associated with the first data elements of the barcode are reserved by the error-correcting code configured to detect and to correct encoding symbolic errors in the first data elements of the barcode, wherein the second data elements are readable by a second barcode reader configured to identify and combine the errors in redundant space to form the document authentication data; and incorporating said generated barcode, having second data elements embedded in the first data elements with the document to form a certified document, the second data elements providing document authentication data to configured barcode readers to verify authenticity of the certified document, and wherein said document has data separate from the document identification data and document authentication data;

storing, by an authentication server, a decryption key for the encrypted document authentication data as associated with the certified document;

receiving a document authentication request from a remote device for the certified document;

identifying the decryption key associated with the certified document;

transmitting the decryption key or decrypted document authentication data to the remote device.

10. The method of claim 9, wherein said error-correcting code is a Reed-Solomon code.

11. A computer-implemented method for authenticating a certified version of a document, the method comprising:

requesting, by a barcode reader, to scan the certified document having a barcode, the barcode including first data elements with error correction data based on first data and second data elements based on second data embedded as errors within the first data elements, wherein the second data is different than the first, wherein the first data elements are readable by a first barcode reader using the error correction data to restore the first data elements of the barcode, and wherein the second data elements of the barcode are readable to a second barcode reader configured to identify and combine the errors in the first data elements to form the second data elements;

obtaining, by said barcode reader from an authentication server, a scan key associated with the certified document;

scanning, by said barcode reader using said scan key, said second data elements of the barcode in the certified document;

identifying said second data in said scanned second data elements of the barcode; and authenticating the certified document based at least in part on said second data and the scan key, and wherein said document has data separate from said second data and said first data.

12. The method of claim 11, wherein said scanning comprises capturing a barcode image.

13. The method of claim 12, wherein said captured image is decoded and decrypted into the first data and the second data by a remote device.

14. The method of claim 11, wherein the second data elements are inserted in the first data elements in at least one error burst and correcting the second data elements by the first barcode reader using redundant data.

15. The method of claim 14, wherein the second data elements appears as an error burst within the first data elements to said barcode reader and are discarded.

16. The method of claim 14, wherein the second data elements are extracted from the first data elements and decrypted using said covert scan key.

17. The method of claim 11, wherein said authenticating further includes issuing, by said barcode reader, a local challenge query;

obtaining, by said barcode reader, a local query response; and verifying, by said barcode reader, a match of said local challenge query and said local query response.

18. The method of claim 11, wherein said authenticating further includes issuing, by said authentication server, a remote challenge query;

obtaining, by said barcode reader, a remote query response; and verifying, by said authentication server, a match of said remote challenge query and said remote query response.

19. A computer-implemented method for tracking a certified version of a document, the method comprising:

obtaining, by an authentication server, a document authentication request from a remote scanning device for the certified document, wherein the certified document includes encrypted document data encoded into a barcode, said barcode having first data elements based on document identification data and encrypted second data elements embedded in the first data elements as errors, the second data elements based on encrypted document authentication data, wherein the document identification data is readable by a first barcode reader using the error correction data, and wherein the encrypted document authentication data is readable by a second barcode reader configured to identify and combine the errors in the first data elements to form the encrypted document authentication data;

identifying, by said authentication server, an decryption key associated with the encrypted second data elements of said barcode and responsive to said document authentication request, transmitting said identified decryption key to said remote scanning device;

obtaining, by said authentication server from said remote scanning device, said barcode with document data;

identifying, by said authentication server, the certified document based on said obtained document data;

recording said document authentication request by said remote scanning device in a tracking record associated with the certified document electronically stored at the authentication server, and wherein said document has data separate from said second data and said first data.

20. The method of claim 19, wherein said identifying includes associating said barcode with the certified document.

21. The method of claim 19, wherein identifying further includes determining whether said tracking record associated with the certified document includes a document alert.

* * * * *